(12) United States Patent
Shah et al.

(10) Patent No.: US 12,002,112 B2
(45) Date of Patent: Jun. 4, 2024

(54) DATA MIGRATION AND REPORTING FOR PAYROLL SYSTEMS

(71) Applicant: People Center, Inc., San Francisco, CA (US)

(72) Inventors: Saurav Shah, Karnataka (IN); Kshitij Bathla, Karnataka (IN)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 17/373,233

(22) Filed: Jul. 12, 2021

(65) Prior Publication Data

US 2023/0011565 A1  Jan. 12, 2023

(51) Int. Cl.
*G06Q 40/12* (2023.01)
*G06Q 10/1091* (2023.01)

(52) U.S. Cl.
CPC ....... *G06Q 40/125* (2013.12); *G06Q 10/1091* (2013.01)

(58) Field of Classification Search
CPC .......................... G06Q 40/125; G06Q 10/1091
USPC ............................................................ 705/32
See application file for complete search history.

(56) References Cited

U.S. PATENT DOCUMENTS

| | | | | |
|---|---|---|---|---|
| 2013/0111562 A1* | 5/2013 | Lee | .................... | G06F 21/6218 726/4 |
| 2013/0166515 A1* | 6/2013 | Kung | .................. | G06Q 10/063 707/690 |
| 2015/0134589 A1* | 5/2015 | Marrelli | ................ | G06F 16/254 707/602 |
| 2019/0303383 A1* | 10/2019 | Thomas | .............. | G06F 16/9024 |
| 2021/0365499 A1* | 11/2021 | Matiushkin | ........... | G06F 16/289 |

OTHER PUBLICATIONS

Qatawhneh, Adel Mohammed et al. Quality of Accounting Information Systems and Their Impact on Improving The Non-Financial Performance Academy of Jordanian Islamic Banks. Accounting and Financial Studies Journal, vol. 24, Issue 6. 2020. (Year: 2020).*
Gordon, Michael Scott. Massive Stars: An Infrared Exploration across the HR Diagram. University of Minnesota. ProQuest Dissertations Publishing, 2018. (Year: 2018).*

(Continued)

*Primary Examiner* — Florian M Zeender
*Assistant Examiner* — Fawaad Haider
(74) *Attorney, Agent, or Firm* — Dority & Manning, P.A.

(57) ABSTRACT

Methods, systems, devices, and tangible non-transitory computer readable media for generating and validating reports. The disclosed technology can access organizational data that can include organizational reports associated with payrolls of an organization. The organizational reports can include fields respectively associated with entries. Formats of the organizational reports can be determined based at least in part on configurations of the fields. Validated reports can then be generated based on the performance of validation operations including evaluation of a validity of each of the organizational reports. The validated reports can include a portion of the fields and a portion of the entries. Furthermore, indications associated with the validity of the portion of the entries of the validated reports that were evaluated can be generated.

20 Claims, 9 Drawing Sheets

(56) References Cited

OTHER PUBLICATIONS

Nguyen, Khanh Truong Duy. Compiler and Runtime Support for Efficient and Scalable Big Data Processing. University of California, Los Angeles ProQuest Dissertations Publishing, 2019. (Year: 2019).*

Xirogiannopoulos, Konstantinos. Enabling Graph Analysis over Relational Databases. University of Maryland, College Park ProQuest Dissertations Publishing, 2020. (Year: 2020).*

* cited by examiner

FIG. 3

Table 302 (source, with reference 306 NAME, 308 DATE, 310 DEPT., 312 GROSS PAY; 314, 316, 318, 320):

| NAME | DATE | DEPT. | GROSS PAY |
|---|---|---|---|
| PER OLAV HANSEN | 02-01-2021 | MARKETING | $2,500.64 |
| ELENA PETROVA | 02-01-2021 | MARKETING | $3,400 |
| ANTHONY KELECHI | 02-01-2021 | MARKETING | $4,720.22 |
| MANFRED STEIN | 02-01-21 | MARKETING | $1,500.04 |
| JAN CHEN | 02-01-2021 | MARKETING | $3,400.75 |
| SAMUEL KARPOV | 02-01-2021 | MKTNG. | $2,500.64 |
| GRETA NORVIG | 02-01-2021 | MARKETING | 1,310.38 |
| YURI MADUENU | 02-01-2021 | MARKETING | $6,200.88 |

Table 304 (corrected, with reference 326 NAME, 328 DATE, 330 DEPT., 332 GROSS PAY; 334, 336, 338, 340):

| NAME | DATE | DEPT. | GROSS PAY |
|---|---|---|---|
| PER OLAV HANSEN | 02-01-2021 | MARKETING | $2,500.64 |
| ELENA PETROVA | 02-01-2021 | MARKETING | $3,400.00 |
| ANTHONY KELECHI | 02-01-2021 | MARKETING | $4,720.22 |
| MANFRED STEIN | 02-01-2021 | MARKETING | $1,500.04 |
| JAN CHEN | 02-01-2021 | MARKETING | $3,400.75 |
| SAMUEL KARPOV | 02-01-2021 | MARKETING | $2,500.64 |
| GRETA NORVIG | 02-01-2021 | MARKETING | $1,310.38 |
| YURI MADUENU | 02-01-2021 | MARKETING | $6,200.88 |

Payroll Modification

Potentially invalid entries have been highlighted Touch any entry to modify it

| Name | Date | Dept. | Gross Pay |
|---|---|---|---|
| Per Olav Hansen | 02-01-2021 | Marketing | $2,500.64 |
| Elena Petrova | 02-01-2021 | Marketing | $5,400 |
| Anthony | 02-01-2021 | Marketing | $4,720.22 |
| Manfred Stein | 02-01-2021 | Marketing | $1,500.04 |
| Jan Chen | 02-01-2021 | Marketing | $5,400.75 |
| Samuel Karpov | 02-01-2021 | Mktng. | $2,500.64 |
| Greta Norvig | 02-01-2021 | Marketing | 1,510.58 |
| Yuri Maduenu | 02-01-2021 | Marketing | $6,200.88 |

Submit Modifications

FIG. 5

DATA MIGRATION AND REPORTING FOR PAYROLL SYSTEMS

FIELD

The present disclosure relates generally to the migration of data between computing systems. More particularly, the present disclosure relates to validating and migrating payroll reports and including indications associated with the validity of the reports.

BACKGROUND

Computing systems can be used as platforms on which various devices and/or applications, including software applications can communicate and exchange data. In an organizational setting, the efficient communication of data between applications can allow for an improved workflow in which data is more accurately communicated between different departments which may use different applications. Further, the applications can generate data in a variety of formats which may present issues with respect to compatibility with other, different applications. For example, legacy applications used by one department may produce reports in a format that is incompatible with newer applications used by a different department. As another example, a department may transition from a legacy application to a newer application. As such, inaccuracies may arise when migrating reports between departments and/or applications, which may require time consuming review to catch inaccuracies.

As such, accurate migration of data between different applications, without time consuming manual review, may lead to an overall improvement in any organizational department that relies on such data. Accordingly, there exists a demand for a more effective way of migrating data between applications that use different data standards or formats.

SUMMARY

Aspects and advantages of embodiments of the present disclosure will be set forth in part in the following description, or can be learned from the description, or can be learned through practice of the embodiments.

One example aspect of the present disclosure is directed to a computing system for the validation and migration of payroll reports, the computing system comprising: one or more processors; and one or more non-transitory computer-readable media that store instructions that, when executed by the one or more processors, cause the computing system to perform operations. The operations can include accessing organizational data that can include one or more organizational reports associated with one or more payrolls of an organization. The one or more organizational reports can include one or more fields respectively associated with one or more entries. The operations can include determining one or more formats of the one or more organizational reports based at least in part on one or more configurations of the one or more fields. The operations can include generating one or more validated reports based at least in part on performance of one or more validation operations comprising evaluation of a validity of each of the one or more organizational reports. The one or more validated reports can include a portion of the one or more fields and a portion of the one or more entries. The operations can include generating one or more indications associated with the validity of the portion of the one or more entries of the one or more validated reports that were evaluated.

One example aspect of the present disclosure is directed to a computer-implemented method of validating and migrating payroll reports. The computer-implemented method can include accessing, by a computing system comprising one or more processors, organizational data that can include one or more organizational reports associated with one or more payrolls of an organization. The one or more organizational reports can include one or more fields respectively associated with one or more entries. The computer-implemented method can include determining, by the computing system, one or more formats of the one or more organizational reports based at least in part on one or more configurations of the one or more fields. The computer-implemented method can include generating, by the computing system, one or more validated reports based at least in part on performance of one or more validation operations comprising evaluation of a validity of each of the one or more organizational reports. The one or more validated reports can include a portion of the one or more fields and a portion of the one or more entries. The computer-implemented method can include generating, by the computing system, one or more indications associated with the validity of the portion of the one or more entries of the one or more validated reports that were evaluated.

Another example aspect of the present disclosure is directed to one or more tangible non-transitory computer-readable media storing computer-readable instructions that when executed by one or more processors cause the one or more processors to perform operations. The operations can include accessing organizational data that can include one or more organizational reports associated with one or more payrolls of an organization. The one or more organizational reports can include one or more fields respectively associated with one or more entries. The operations can include determining one or more formats of the one or more organizational reports based at least in part on one or more configurations of the one or more fields. The operations can include generating one or more validated reports based at least in part on performance of one or more validation operations comprising evaluation of a validity of each of the one or more organizational reports. The one or more validated reports can include a portion of the one or more fields and a portion of the one or more entries. The operations can include generating one or more indications associated with the validity of the portion of the one or more entries of the one or more validated reports that were evaluated.

Other aspects of the present disclosure are directed to various systems, apparatuses, non-transitory computer-readable media, user interfaces, and devices for the validation and migration of payroll reports.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts an example of validating and migrating payroll reports according to example embodiments of the present disclosure.

FIG. 5 depicts an example of a graphical user interface to modify payroll reports according to example embodiments of the present disclosure.

Figure 1:
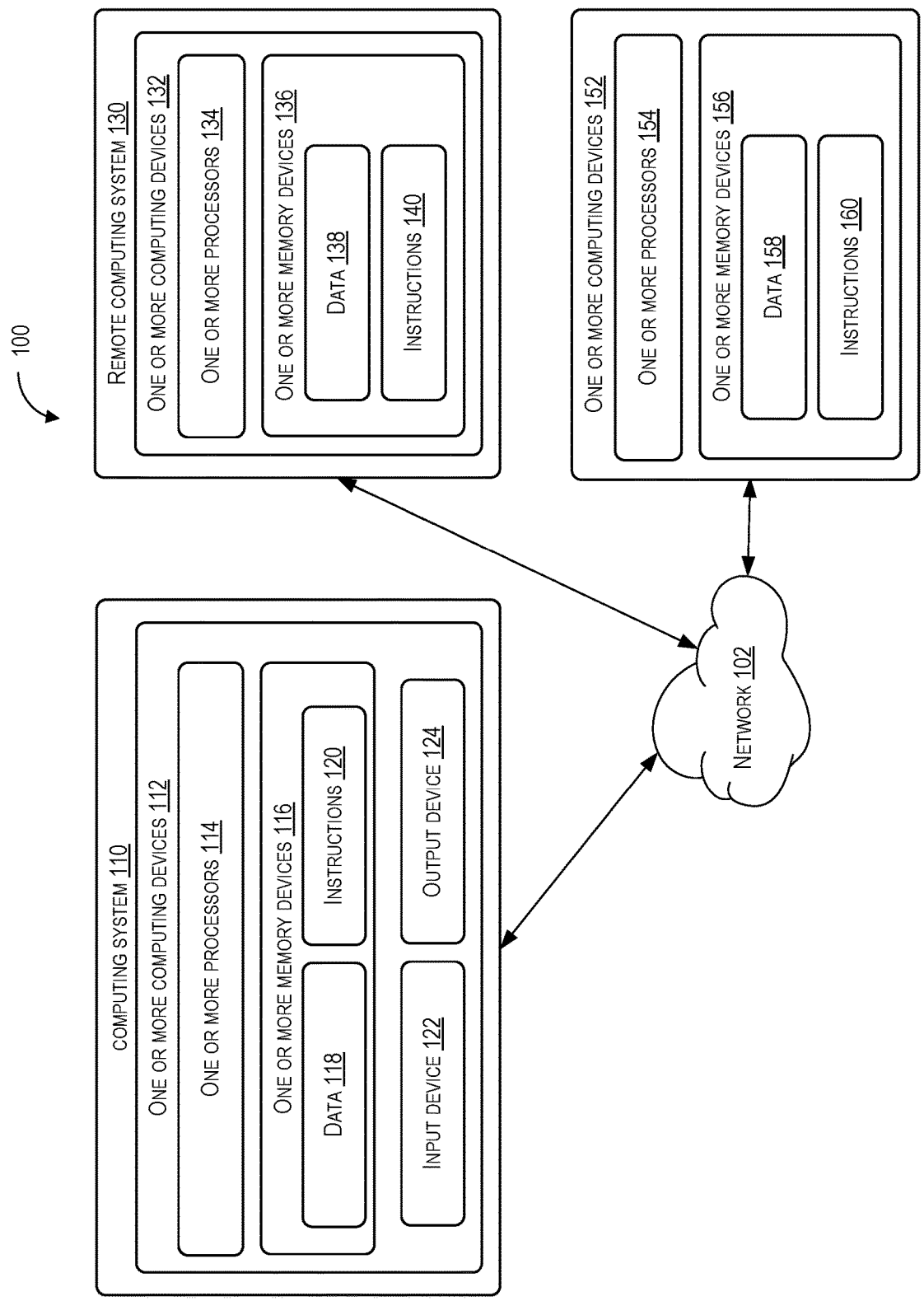
FIG. 1 depicts a block diagram of an example environment including a computing system that performs operations according to example embodiments of the present disclosure.

Reference numerals that are repeated across plural figures are intended to identify the same features in various implementations.

DETAILED DESCRIPTION

The present disclosure is generally directed to the validation and migration of organizational data including payroll reports. In particular, example aspects of the present disclosure are directed to a computing system that can be used to access organizational data that includes payrolls of an organization, validate organizational reports associated with the payrolls, and generate indications that show those portions of the payrolls that were validated. Further, the computing system described herein can provide specific benefits to the validation and migration of data for an organization that manages disparate applications data for a large group of users. For example, the disclosed technology can analyze the structure and content of organizational reports in order to validate the organizational reports. In this way, a data administrator or other user of the disclosed technology can manage the validation and migration of data between different applications and/or departments of an organization.

In particular, one example aspect of the present disclosure is directed to computing systems that can provide improved data migration assistance. As one example use case, data migration between systems (e.g., two payroll systems) is typically very labor intensive and may require efforts that span multiple data cycles (e.g., pay runs). Migration of data which spans multiple data cycles (e.g., pay runs) can cause the action (e.g., payroll) performed during the intermediate bridge period (e.g., the period in which migration occurs) to potentially be inaccurate, which can cause cascading errors. For example, an amount and/or type of tax payment due in a current pay run is typically a function of tax payments already paid in past pay runs and, therefore, inaccurate indication of past payments can result in incorrect current payments. Example aspects of the present disclosure can reduce these problems by providing tools for more efficient and accurate migration of data. For example, an example data migration tool can intake or retrieve data from a previous payroll system. For example, the data migration tool can cause the previous payroll system to generate a number of standard reports. Alternatively or additionally, a user can interact with the previous payroll system to generate the standard reports and then can upload (or otherwise enable access to) the standard reports for the data migration tool. The tool can parse the standard reports and synthesize the data. The tool can run validations on the synthesized data to detect inconsistent or conflicting data elements. These data conflicts can be flagged to a user and the tool can provide suggestions for error remediation/correction. For example, the tool may detect that an employee's state or exemption status is different in two different reports generated by a previous system. Current data in a new system can be evaluated to disambiguate the correct state or exemption status. By providing more efficient and accurate migration of data (e.g., including proactive error detection and correction) the systems and methods described herein can shrink the window of data migration between two data systems. This can avoid the situation where migration spans multiple data cycles (e.g., pay runs), thereby reducing the number of cascading errors which occur during the migration period.

More generally, example aspects of the present disclosure are directed to an organizational management platform that controls and leverages organizational data to enable the automatic validation and migration of data for different users or groups of users (e.g., groups of employees of an organization) included in a set of users (e.g., all employees of an organization). In particular, an organizational management platform can control and leverage organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via.csv files) from third-party applications.

The organizational data can, in some implementations, be held as one or more object databases. For example, multiple object classes can be defined in the object databases. Example object classes include employees, devices, job candidates, benefits policies, documents, pay instances, time cards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

According to one example aspect, an administrator or other user of the organizational management platform can be enabled to perform validation operations that evaluate the validity of organizational reports such as payroll reports. When used to validate organizational reports such as payroll reports, the organizational management platform may be referred to as a data validation computing system.

In particular, a payroll report can include data describing a payroll of an organization or actions taken with respect to a payroll of an organization. For example, payroll reports can detail how much employees were paid, how much tax was withheld, data regarding elections/contributions, etc. Example aspects enable the ability to migrate payroll data from one application to another using standard reporting features from the legacy application (e.g., standard report formats such as CSV files, spreadsheet files, data table readouts, and/or the like).

In some implementations, the data validation computing system can include a graphical user interface that provides an easy way to view and modify fields and entries of organizational reports (e.g., payroll reports) with a relatively low level of user foreknowledge. For example, a user can modify entries by selecting fields that are provided via the graphical user interface. In this way, the potentially complicated process of manually reviewing and validating payrolls can be avoided or significantly reduced. Instead, the user can review automatically validated payrolls.

By way of example, a computing system implementing the disclosed technology can access organizational data that includes organizational reports associated with one or more payrolls of an organization. For example, a data validation computing system can access organizational data that includes various data associated with an organization including payroll reports for employees of the organization that are stored in a variety of formats generated by various applications. The one or more organizational reports can include one or more fields respectively associated with one or more entries. For example, the organizational reports generated by different applications can include different fields and entries arranged in different ways. One or more formats of the one or more organizational reports can then be determined based at least in part on one or more configurations of the one or more fields. For example, the data validation computing system can analyze the fields and entries to determine various properties including the size of the fields and the data types that can be provided in the entries. One or more validated reports can be generated based at least in part on performance of one or more validation operations comprising evaluation of a validity of each of the one or more organizational reports. The one or more validated reports can include a portion of the one or more fields and a portion of the one or more entries. The data validation computing device can then generate one or more indications associated with the validity of the portion of the one or more entries of the one or more validated reports that were evaluated. For example, the entries that may be invalid may be underlined with red underlining that is readily visible to a user.

Accordingly, the disclosed technology may improve the effectiveness with which data (e.g., payroll data) is validated and/or migrated. In particular, the disclosed technology can facilitate the creation of a user-friendly interface via which an authorized user can modify fields and/or entries of reports including payroll reports without the burdensome need to remember to manually check each field and entry one by one. Further, the disclosed technology can provide indications of specific types of invalidity that may be present in a payroll report, thereby significantly increasing the speed with which payroll reports can be validated.

The computing system can receive, access, obtain, and/or retrieve data which can include organizational data. The organizational data can include one or more organizational reports associated with one or more payrolls of an organization. Further, the one or more organizational reports can include one or more fields respectively associated with one or more entries. The computing system can access organizational data that is stored locally and/or on a remote computing system and/or remote computing device. For example, the computing system can access organizational data that is stored on storage devices under the control of an organization including organizational computing systems and/or cloud computing systems on remote computing systems that are controlled by a third-party that hosts organizational data of the organization.

The organizational data can include one or more organizational reports that can be associated with one or more departments, one or more groups, and/or one or more teams of an organization. In one example for which aspects of the present disclosure provide particular benefits, the organizational data can be associated with one or more payrolls of an organization. For example, the organizational data can include one or more reports that include data and/or information associated with one or more names of employees of the organization, one or more names of contractors that perform work for the organization, one or more identifiers that can be used to uniquely identify any entity (e.g., an employee, contractor, third-party organization, and/or department of the organization) associated with the organization (e.g., an employee id, contractor id, third-party organization id, and/or department id), pay and/or earnings of any entity associated with the organization including records of funds paid to the entity (e.g., funds paid in the form of income to an employee), taxes (e.g., federal taxes and/or state taxes; and/or taxes allocated to specific benefits including medical care taxes and/or retirement fund taxes), adjustments to gross earnings, and/or any deductions associated with any pay.

The organizational data can include one or more fields and any of the one or more entries that are used to configure and/or arrange one or more portions of the organizational data. The one or more entries can include values that are associated with respective fields. For example, the one or more entries can include one or more alphanumeric characters that represent one or more values associated with a particular field. For example, a name field can include alphabetic characters indicating the name of an employee and a gross pay field can include numeric values expressed as units of some currency (e.g., U.S. dollars) and precise to two (2) decimal places (e.g., $3,450.56). By way of further example, the organizational data can include an organizational report (e.g., a payroll report) that includes fields for the names of employees and the net pay for each of the employees respectively. Further, the fields can include the names of individual employees and the respective net pay that is earned by each of the individual employees. Further, the organizational data can include fields that include one or more entries that are based at least in part on one or more entries from one or more other fields. For example, the entry in the field for the gross pay of the marketing department of an organization can be based at least in part on the sum total of the gross pay of the entries in the fields for gross pay of the employees in the marketing department.

The computing system can determine one or more formats of the one or more organizational reports (e.g., payroll reports) based at least in part on one or more configurations of the one or more fields. For example, the computing system can analyze the one or more organizational reports and determine the types of the one or more fields and the one or more entries. For example, the computing system can determine the size (e.g., number of characters) and character type (e.g., numbers, letters) that each of the one or more fields can accommodate; and the value of each of the one or more entries. Further, the computing system can determine one or more structures of the one or more organizational reports including the configuration and arrangement of the one or more fields and/or the one or more entries. For example, the computing system can determine an ordering of the one or more fields and/or one or more entries within each of the one or more organizational reports that may be associated with a respective organizational report format.

The computing system can generate one or more validated reports (e.g., validate payroll reports) based at least in part on performance of one or more validation operations. The one or more validation operations can include evaluating a validity of each of the one or more organizational reports. The one or more validated reports can include a portion of the one or more fields and a portion of the one or more entries. In particular, the computing system can perform one or more validation operations to evaluate the validity of each of the one or more fields and/or the one or more entries of the one or more organizational reports. Further, the computing system can determine whether each of the one or more fields and/or one or more entries of the one or more organizational reports is valid based at least in part on the one or more formats of the one or more organizational reports. For example, each format may be associated with a specific type of entry (e.g., a numeric entry within a predetermined range) and the entry in a field could be determined to be valid if the entry conforms to the specific type (e.g., the entry is numeric and within the predetermined range) and could be determined to be invalid if the entry does not conform to the specific type (e.g., the entry is non-numeric and/or is outside the predetermined range).

The one or more validation operations can include comparing the one or more entries of the one or more organizational reports to the one or more fields respectively associated with the one or more entries. For example, the computing system can compare one or more name fields (e.g., one or more fields configured to receive entries including the names of employees of an organization) to the corresponding entries in the one or more name fields. Further, the one or more comparisons can include one or more comparisons of properties and/or attributes of the one or more entries including one or more lengths of the one or more entries, one or more data types of the one or more entries, and/or one or more change permissions of the one or more entries (e.g., view an entry, change an entry, and/or delete an entry).

Further, the one or more validation operations can include determining, based at least in part on the comparison, that the one or more entries with a format that does not correspond to the one or more fields are not valid. For example, the computing system can compare a name field that is configured to receive an entry that includes one or more alphabetic characters (e.g., the name field can be associated with the name "SAM JONES") to the actual entry in the name field which is numeric (e.g., the entry in the name field can be "12/04/2021") and determine that the entry is not valid.

The one or more validation operations can include determining the one or more entries of the one or more organizational reports (e.g., payroll reports) that correspond to the portion of the one or more fields of the one or more validated reports. For example, a name field of the one or more organizational reports can have a corresponding name entry that satisfies certain criteria including having at least a first name and a last name and including alphabetic characters. Further, the one or more validation operations can include mapping the one or more entries of the one or more organizational reports to the one or more organizational fields of the one or more validated reports. For example, the computing system can map the name field of an organizational report to the name field of a validated report.

The one or more validation operations can include determining an entity associated with an organizational report of the one or more organizational reports. An entity associated with an organizational report can include an individual or a group (e.g., a department or team of an organization). In some embodiments, the entity can include an employee of the organization, a contractor associated with the organization, and/or a department of the organization.

By way of example, an entry for an entity could include a personal name identifying an individual (e.g., "MILA KONSTANTINOVA") or an organizational department (e.g., "ACCOUNTING DEPARTMENT"). Further, the entity can be associated with one or more fixed entries. A fixed entry can be an entry that should remain the same and/or not be different when entered in different fields of the same organizational report or when entered in different organizational reports. For example, a personal name may remain consistent in length and spelling across different fields within the same organizational report and/or different organizational reports.

Further, the one or more validation operations can include determining that a portion of the one or more organizational reports is not valid when the one or more fixed entries associated with the entity are different across the one or more organizational reports. Further, the portion of the one or more organizational reports can be a portion that is not the largest portion of the one or more organizational reports that is associated with the one or more fixed entries. For example, ninety-nine percent (99%) of the one or more organizational reports can include entries that have a first value and one percent (1) percent of entries that include other values. The computing system can determine that the entries with the first value are fixed entries and are valid and that the entries with the other values are not valid.

In some embodiments, each of the one or more fields can be associated with one or more field properties including a field type, a field length, and/or a field creation time. Further, the one or more validation operations can include evaluating a consistency of the one or more field properties across the one or more organizational reports. For example, the computing system can perform validation operations including determining whether a date field indicating the payment date for an employee consistently uses a month-day-year (e.g., Aug. 24, 1979) format. If the one or more properties are consistent across the one or more organizational reports (e.g., different organizational reports use the same format for the date field) then the fields can be determined to be valid. If the one or more properties are not consistent across the one or more organizational reports (e.g., different organizational reports use a different format for the date field) then the fields can be determined to be invalid.

In some embodiments, each of the one or more entries can be associated with one or more entry properties comprising an entry type, an entry length, and/or an entry creation time. Further, the one or more validation operations can include evaluating a consistency of the one or more entry properties across the one or more organizational reports. For example, the computing system can perform validation operations including determining whether a date entry indicating the manager of an organizational department is consistent across organizational reports. If the one or more properties are consistent across the one or more organizational reports (e.g., the manager of the department is the same across organizational reports) then the entries can be determined to be valid. If the one or more properties are not consistent across the one or more organizational reports (e.g., the manager of the department is the same across organizational reports) then the entries can be determined to be invalid.

The computing system can generate one or more indications associated with the validity of the portion of the one or more entries of the one or more validated reports that were evaluated. For example, the computing system can display the one or more validated reports and generate one or more indications that show potentially invalid entries in a bold font. In some embodiments, the one or more indications can include one or more indications that a field is valid, one or more indications that a field is not valid, one or more indications that an entry is valid, and/or one or more indications that an entry is not valid.

The computing system can generate one or more indications associated with the validity of the portion of the one or more fields of the one or more validated reports that were evaluated. For example, the computing system can generate the textual indication "VALID" above each field that is valid and generate the textual indication "INVALID" above each field that is not valid.

The computing system can determine one or more types of invalidity for each of the one or more entries that are not valid. The one or more indications can include one or more invalidity indications associated with the one or more types of invalidity for each of the one or more entries that are not valid. For example, the computing system can generate the textual indication "INVALID SYNTAX" above each entry that has invalid syntax and generate the textual indication "FIELD-ENTRY INVALIDITY" above each entry that is not valid due to the entry not being consistent with the field.

Further, the computing system can generate, based at least in part on the one or more types of invalidity, one or more indications comprising one or more descriptions of the one or more types of invalidity of the one or more entries. For example, in the event that a field-entry inconsistency has been determined for an entry, the computing system can generate the indication "FIELD-ENTRY INVALIDITY DUE TO NON-DATE VALUE IN DATE FIELD" to indicate that the entry "MARKETING DEPARTMENT" is in a date field that is configured to include a date value that is numeric.

In some embodiments, the one or more types of invalidity can include invalid syntax, field-entry inconsistency invalidity, and/or quantitative invalidity. For example, invalid syntax can include personal names that include asterisks and question mark characters. By way of further example, inconsistency invalidity can include an inconsistent ordering of the day, month, and year in a date field. Quantitative invalidity can include one or more fields that include an entry that exceeds a predetermined maximum entry length or that is less than a predetermined minimum entry length. For example, a name field may be limited to entries of fifty characters or less and a two hundred character name entry would exceed the maximum name field entry length.

The computing system can generate a graphical user interface that includes one or more interface elements respectively associated with the one or more fields of the one or more validated reports. Further, the one or more interface elements can be configured to receive one or more inputs to modify the one or more entries. For example, the graphical user interface can be generated on a display output component of the computing system and can be configured to receive one or more inputs (e.g., one or more touch inputs) from the user via either an attached keyboard or an onscreen keyboard that is displayed on the display output component.

Further, the computing system can receive the one or more inputs to modify the one or more entries. For example, a user of the computing system that is authorized to modify (e.g., edit) the one or more entries of the one or more organizational reports can enter new entries and/or modify existing entries via the graphical user interface. Further, the user can use one or more interface elements (e.g., controls to submit modifications of the one or more entries and/or onscreen numeric keypads to enter numbers) of the graphical user interface to enter the one or more inputs.

Further, the computing system can modify the one or more entries based at least in part on the one or more inputs. For example, the computing system can be configured to use the one or more inputs as an entry that is provided to modify the one or more entries by either adding the one or more inputs (e.g., an entry based at least in part on one or more textual inputs entered via a keyboard) to a field that is empty, adding the one or more inputs to an existing entry in a field that is not empty, or deleting the entry in a field if the one or more inputs are associated with deleting an entry.

In some embodiments, modifying the one or more entries can include deleting an entry of the one or more entries, adding a new entry to the one or more entries, and/or changing an entry of the one or more entries. For example, the computing system can be configured to delete the entry "EMMANUEL CHALMERS" that is in a data field and/or add the entry "02/02/2021" to a date field that is empty and/or is capable of receiving more than one entry. Further, the computing system can be configured to change the invalid entry "01/99/1990" in a date field to the valid entry "01/09/1990" (e.g., Sep. 1, 1990 in a day, month, year format) which includes a valid month.

In some embodiments, the one or more indications can include a highlight around the one or more entries that are not valid and/or one or more colors around the one or more entries that are not valid. For example, the computing system can generate one or more bright red highlights around the one or more entries that are not valid. The bright red color of the highlights may be more visible to a user and allow the user to more easily identify the one or more entries that are not valid.

In some embodiments, the one or more entries can include one or more payroll entries for one or more employees of the organization. For example, the one or more payroll entries can include the names of employees of an organization, the respective organizational departments of the employees, the date the payroll entry was recorded, and bi-weekly payments respectively associated with the employees.

In some embodiments, the one or more formats can be associated with one or more applications that generate the one or more organizational reports (e.g., payroll reports). For example, the organizational data can be associated with a particular software application or computer program that is configured to access, store, modify, and/or delete one or more portions of the organizational data.

Further, the one or more applications can be respectively associated with one or more organizational reports formats. In particular, the one or more applications can include information and/or data associated with one or more formats and/or one or more configurations of the one or more reports. Further, the one or more applications can include information indicating the arrangement and types of fields in the one or more organizational reports. For example, an application can include information indicating that the date field for an organizational report precedes the payment field and that the date field is formatted in a day-month-year format.

In some embodiments, the one or more configurations can include one or more positions of the one or more fields within the one or more organizational reports. For example, the one or more configurations can indicate one or more pages, rows, and/or columns of the one or more organizational reports that are respectively associated with the one or more fields. Further, the one or more positions can include a position in which the page, row, and/or column of a field are indicated. Further, the one or more positions of the one or more fields can include ordered positions of the one or more fields. For example, a group identifier field may be the first field in an organizational report, a name field may be the second field in the organizational report, and an employee title field may be the third field in the organizational report. The computing system can then perform one or more validation operations including validating the one or more organizational reports based at least in part on the one or more positions conforming to a valid ordering of the one or more fields within an organizational report (e.g., the first field being a group identifier field, the second field being a name field, and the third field being an employee title field).

In some embodiments, the one or more positions can include one or more absolute positions of the one or more fields and/or one or more relative positions of the one or more fields. For example, the one or more absolute positions of the one or more fields can indicate that each of the one or more fields will be in one or more corresponding positions (e.g., a position with a particular page, row, and column) within an organizational report. By way of further example, the one or more relative positions of the one or more fields can include positions in which certain fields come before other fields (e.g., when read from top to bottom, a name field may have a position within an organizational report that is above an address field irrespective of the number of other fields that are between the name field and the address field).

The disclosed technology can include a computing system and/or computing device that is configured to perform various operations associated with the validation and migration of organizational data including payroll reports. In some embodiments, the user computing system can be associated with various computing systems and/or devices that use, send, receive, and/or generate information and/or data associated with the generation and/or migration of organizational data. Furthermore, the user computing system can process, generate, modify, and/or access (e.g., send and/or receive) data and/or information including data and/or information associated with one or more fields respectively associated with one or more entries of one or more organizational reports.

In some implementations, the disclosed computing system can be operated from a server computing system that may be accessed by a user via one or more computing devices that are connected to the server computing system. Further, the disclosed computing system can be configured to access organizational data that may be stored locally or at remote locations that are accessible via a communications network (e.g., a Local Area Network (LAN) and/or the Internet).

The computing system and/or computing device can include specialized hardware and/or software that enables the performance of one or more operations specific to the disclosed technology. Further, a computing system and/or computing device can include one or more application specific integrated circuits that are configured to perform operations associated with the validation and migration of organizational data including payroll reports.

The systems, methods, devices, apparatuses, and tangible non-transitory computer-readable media in the disclosed technology can provide a variety of technical effects and benefits including an improvement in the validation and migration of organizational data including payroll reports. In particular, the disclosed technology may assist a user (e.g. an administrator of organizational data) in performing a technical task by means of a continued and/or guided human-machine interaction process in which the user can interact with a user interface that can be used to generate and/or configure one or more organizational reports associated with payrolls of an organization. Furthermore, the disclosed technology may also provide benefits including improvements in computing resource usage efficiency, security, and ease of use.

The disclosed technology can provide a variety of technical effects and benefits with respect to the efficiency of utilizing computing resource usage by increasing the accuracy of organizational data associated with payrolls of an organization. By validating the organizational data, the number of inaccurate entries can be reduced, thereby reducing the number of entries that need to be revised. Further, by generating indications on payroll entries that may be invalid, the process of identifying entries that may need to be reviewed and amended can be greatly streamlined. Instead of burdensome manual searches of potentially invalid payroll entries, the disclosed technology can automatically identify entries that may be invalid.

As such, the disclosed technology may assist a user in more effectively performing a variety of data validation operations by providing the specific benefits of improved validation of organizational data associated with an organization's payrolls. Further, any of the specific benefits provided to users can be used to improve the effectiveness of a wide variety of devices and services including any devices or services that rely on the disclosed technology. Accordingly, the improvements offered by the disclosed technology can result in tangible benefits to a variety of applications, devices, and/or systems including mechanical, electronic, and computing systems associated with the validation of organizational data and generation of validated reports.

With reference to the Figures, example embodiments of the present disclosure will be discussed in further detail.

FIG. 1 depicts a block diagram of an example environment including a computing system that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the Internet. Further, the network 102 can include any number of wired or wireless connections and/or links that can be used to communicate with one or more systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems and/or one or more computing devices. Further, the computing system 110 may be connected (e.g., networked) to one or more computing systems and/or one or more computing devices via the network 102. The computing system 110 may operate in various different configurations including as a server or a client machine in client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can be include any processing device (e.g., a processor core, a microprocessor, an ASIC, a FPGA, a controller, or a microcontroller) and can include one processor or a plurality of processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random access memory (RAM), read only memory (ROM), EEPROM, EPROM, one or more flash memory devices, one or more magnetic storage devices (e.g., one or more hard disk drives).

The one or more processors 114 can be configured to execute one or more instructions to perform the operations described herein including for example, one or more operations associated with validating organizational reports (e.g., payroll reports) and generating validated reports (e.g., validated payroll reports). Further, the one or more memory devices 116 can store the data 118 and/or the instructions 120, which can be executed by the one or more processors 114 to cause the one or more computing devices 112 to perform one or more operations.

The data 118 can include organizational data (e.g., organizational data including one or more organizational reports as described herein. Further, the instructions 120 can include one or more instructions to use data including the data 118 to perform the one or more operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be configured to manage the one or more applications. For example, the computing system 110 can perform one or more operations associated with validating organizational data that includes organizational reports associated with payrolls in one format and generating validated reports that may be in a different format.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more user inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110 and may be configured to perform any of the operations performed by the computing system 110. Further, the remote computing system 130 can communicate with one or more devices and/or one or more systems via the network 102.

In some embodiments, the remote computing system 130 can include one or more applications (e.g., computing software applications) that can be stored and/or executed by the remote computing system 130. Further, the one or more applications can include one or more extra-organizational applications that may be accessed from the computing system 110 and which are at least partly operated from the remote computing system 130. The one or more extra-organizational applications can be associated with an organization that is different from the organization that is associated with the computing system 110 (e.g., the extra-organizational applications can include one or more third-party applications). Further, the data 138 can include one or more portions of the organizational data.

Figure 2:
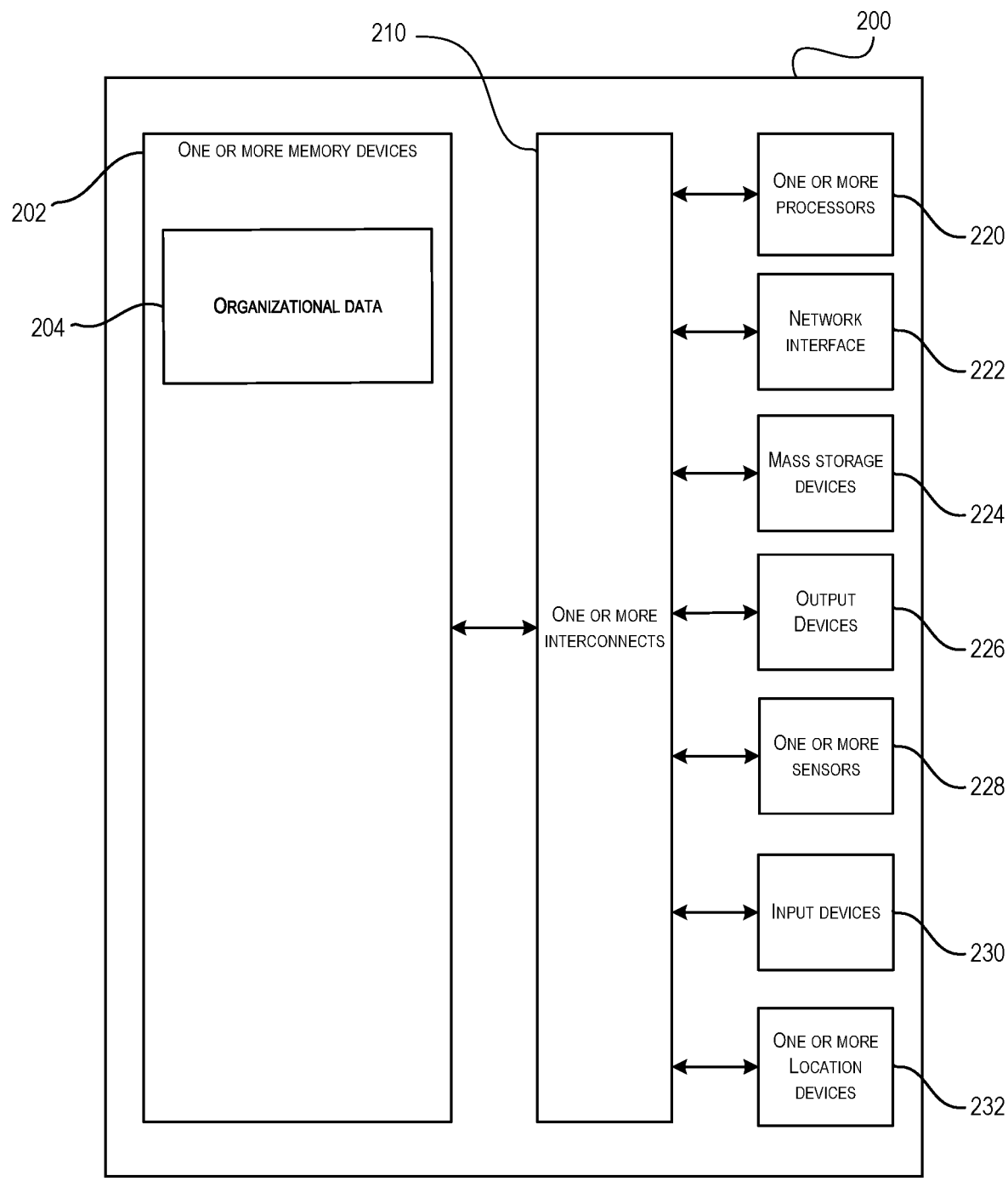
FIG. 2 depicts a block diagram of an example of a computing device according to example embodiments of the present disclosure.

FIG. 2 depicts a block diagram of an example computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 204, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the organizational data 204). Further, the one or more memory devices 202 can include one or more non-transitory computer-readable storage media, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations including one or more operations associated with accessing organizational data, determining one or more formats of one or more organizational reports, generating validated reports, and generating indications associated with the validity of entries of the validated reports.

The organizational data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational data 204 can include information associated with one or more organizational reports. In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The one or more interconnects 210 can include one or more interconnects or buses that can be used to send and/or receive one or more signals (e.g., electronic signals) and/or data (e.g., the organizational data 204) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the location device 232. The one or more interconnects 210 can be arranged or configured in different ways. For example, the one or more interconnects 210 can be configured as parallel or serial connections. Further the one or more interconnects 210 can include: one or more internal buses that are used to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the Internet). For example, the network interface 222 can allow the computing device 200 to communicate with the computing system 110 via the network 102.

The one or more mass storage devices 224 (e.g., a hard disk drive and/or a solid state drive) can be used to store data including the organizational data 204. The one or more output devices 226 can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of a user interface that is used to access organizational data, generate one or more validated reports, and generate indications associated with the validity of entries of the one or more validated reports. For example, the one or more sensors 228 can be used to authenticate the identity of a user based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications that access organizational data and perform operations including validation operations that can be implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The location device 232 can include one or more devices or circuitry for determining the position of the computing device 200. For example, the location device 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or beacons.

FIG. 3 depicts an example of validating and migrating payroll reports according to example embodiments of the present disclosure. A computing device 300 can include one or more attributes and/or capabilities of the computing system 110, the remote computing system 130, the one or more computing devices 152, and/or the computing device 200. Furthermore, the computing device 300 can be configured to perform one or more operations and/or one or more actions that can be performed by the computing system 110, the remote computing system 130, the one or more computing devices 152, and/or the computing device 200.

As shown in FIG. 3, the computing device 300 generates output including an organizational report 302, a validated report 304, a name field 306, a date field 308, a department field 310, a gross pay field 312, an entry 314, an entry 316, an entry 318, an entry 320, a name field 326, a date field 328, a department field 330, a gross pay field 332, an entry 334, an entry 336, an entry 338, and an entry 340.

In this example, the computing device 300 is configured to generate output including the organizational report 302 and the validated report 304. The output of the computing device 300 can be based at least in part on organizational data that can be stored locally on the computing device 300 and/or stored at a remote location.

The organizational report 302 can be a payroll report for an organization and can include various fields that are used to indicate payroll fields and corresponding entries for a set of employees of the organization. In this example, the computing system has accessed the organizational report 302 and has performed one or more validation operations on the organizational report 302 to cause the computing device 300 to generate the validated report 304. The organizational report 302 includes an entry 314 that is associated with the gross pay field 312 and indicates the gross pay for an individual. In this example, the computing device 300 has determined that the format of the entry 314 does not conform to the format of the gross pay field 312. In particular, the entry 314 does not have precision to two decimal places as specified by the gross pay field 312. The computing device 300 can perform one or more validation operations including generating the entry 334 in the validated report 304. The entry 334 is a valid entry that conforms to the format of the gross pay field 312 and the gross pay field 332.

Further, the one or more validation operations include the computing device 300 determining that the entry 318 includes an abbreviation of the word "MARKETING" and has generated the entry 338 which conforms to the format specified in the department field 310 of the organizational report 302 and the corresponding department field 330 of the validated report 304. In this example, the computing device 300 has also determined that the entry 320 does not include a dollar sign and has generated the entry 340 in the validated report 304 which includes the dollar sign.

Figure 4:
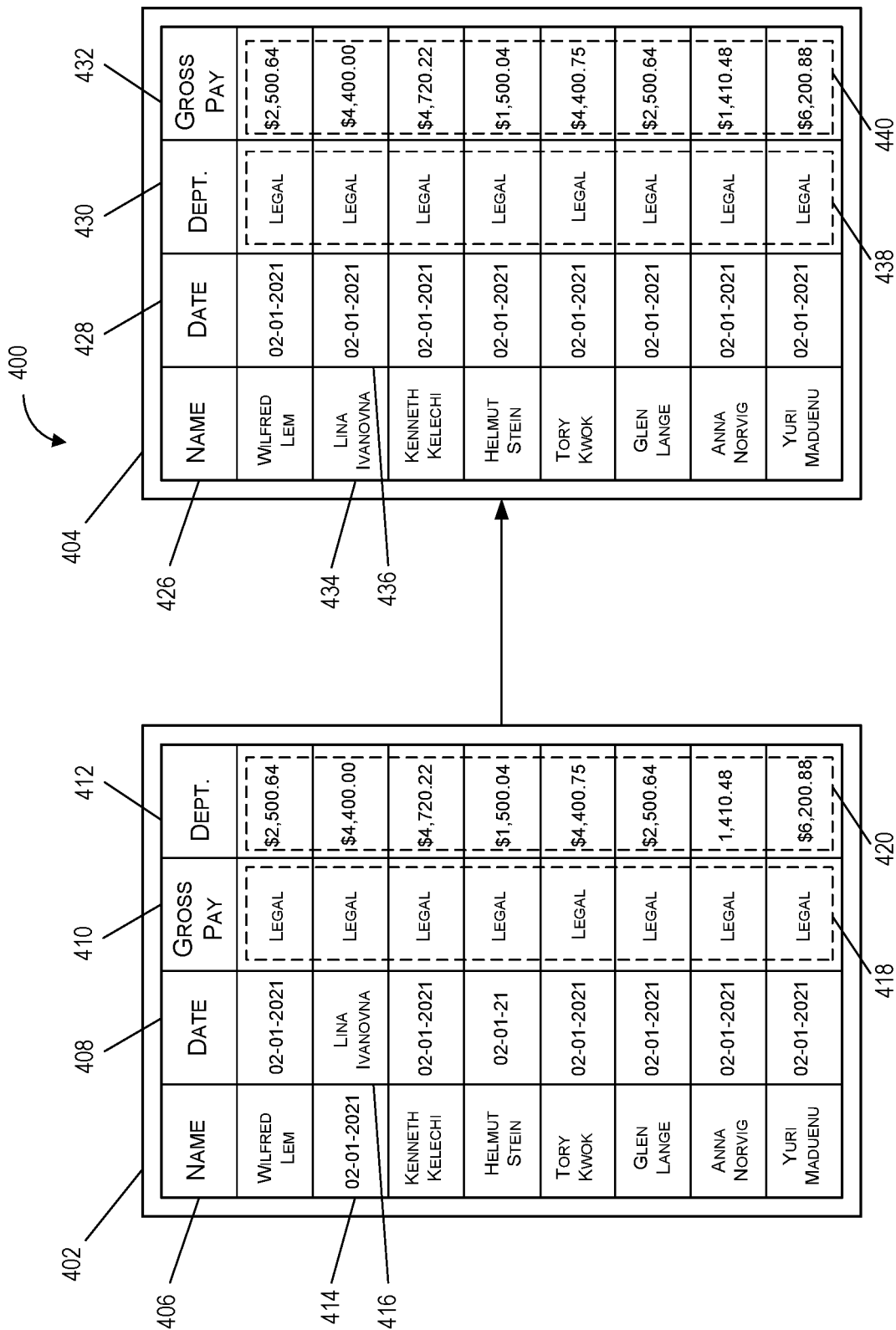
FIG. 4 depicts an example of validating and migrating payroll reports according to example embodiments of the present disclosure.

FIG. 4 depicts an example of validating and migrating payroll reports according to example embodiments of the present disclosure. A computing device 400 can include one or more attributes and/or capabilities of the computing system 110, the remote computing system 130, the one or more computing devices 152, and/or the computing device 200. Furthermore, the computing device 400 can be configured to perform one or more operations and/or one or more actions that can be performed by the computing system 110, the remote computing system 130, the one or more computing devices 152, and/or the computing device 200.

As shown in FIG. 4, the computing device 400 generates output including an organizational report 402, a validated report 404, a field 406, a field 408, a field 410, a field 412, an entry 414, an entry 416, entries 418, entries 420, a field 426, a field 428, a field 430, a field 432, an entry 434, an entry 436, entries 438, and an entries 440.

In this example, the computing device 400 is configured to generate output including the organizational report 402 and the validated report 404. The output of the computing device 400 is based at least in part on organizational data that can be stored locally on the computing device 400 and/or stored at a remote location.

The organizational report 402 can be a payroll report for an organization and can include various fields that are used to indicate payroll for a set of employees of the organization. In this example, the computing system has accessed the organizational report 402 and has performed one or more validation operations on the organizational report 402 and generated the validated report 404. The organizational report 402 includes a field 412 that indicates "DEPT." and is associated with the entries 420 that are shown as being listed below the field 412 (e.g., the entries "$2,500.64 . . . $6,200.88"). The computing device 400 can determine that the format of the field 412 does not match the format of the entries 420 that are supposed to be associated with the field 412. Further, the computing device 400 can determine that the format of the field 410 (e.g., "GROSS PAY") does not match the format of the entries 418 (e.g., the entries "LEGAL . . . LEGAL") listed below the field 410 that are supposed to be associated with the field 410. The computing device 400 can perform one or more validation operations including comparing the field 410 to entries including the entries 418 and the entries 420. Based at least in part on the comparisons, the computing device 400 can determine that the format of the field 410 matches the format of the entries 420 and that the format of the field 412 matches the format of the entries 418.

The computing device 400 can perform one or more validation operations including generating the entries 438 in the field 430 which has format that matches the entries 438. Further, the computing device 400 can generate the entries 440 in the field 432 which has a format that matches the format of the entries 440. The one or more validation operations of the computing device 400 result in the format of the entries 438 conforming to that of the field 430 and the format of the entries 440 conforming to that of the field 432.

Additionally, the computing device 400 can determine that the entry 414 ("02-01-2021") does not correspond to the format of the field 406 and that the entry 416 (e.g., "LINA IVANOVNA") does not correspond to the format of the field 408. The computing device 400 can then generate the entry 434 in the field 426 (e.g., "NAME") such that the format of the entry 434 matches the format of the field 426. Further, the computing device 400 can generate the entry 436 in the field 426 (e.g., "NAME") such that the format of the entry 436 matches the format of the field 428.

FIG. 5 depicts an example of a graphical user interface to modify payroll reports according to example embodiments of the present disclosure. A computing device 500 can include one or more attributes and/or capabilities of the computing system 110, the remote computing system 130, the one or more computing devices 152, and/or the computing device 200. Furthermore, the computing device 500 can be configured to perform one or more operations and/or one or more actions that can be performed by the computing system 110, the remote computing system 150, the one or more computing devices 152, and/or the computing device 200.

As shown in FIG. 5, the computing device 500 includes a display component 502, a user interface 504, an interface element 506, an interface element 508, an interface element 510, an interface element 512, an interface element 514, an interface element 516, and an interface element 518.

In this example, the computing device 500 is configured to generate output including a user interface 504 (e.g., a graphical user interface) that includes the interface elements 506-518, which are displayed on the display component 502. The output of the computing device 500 is based at least in part on one or more validation operations that have been performed on organizational data.

The display component 502 can be configured to receive one or more inputs to cause the computing device 500 to perform one or more operations (e.g., one or more validation operations). For example, the display component 502 can be configured to receive one or more touch inputs from a user to indicate the selection by the user of an interface element to the user interface 504. In some embodiments, the computing device 500 can receive other types of input including audio input (e.g., a user speaking a command to select an interface element), an external input device (e.g., a mouse device or keyboard), or a gesture (e.g., a gesture recognized by a camera of the computing device 500). In some embodiments, the computing device 500 can be configured to receive one or more inputs from one or more other computing devices (e.g., a laptop computer, a desktop computer, and/or a smartphone) that communicate with the computing device 500.

The user interface 504 includes the interface element 506 that provides the indication "POTENTIALLY INVALID ENTRIES HAVE BEEN HIGHLIGHTED TOUCH ANY ENTRY TO MODIFY IT" instructing the user that potentially invalid entries have been highlighted. For example, the computing device 500 can determine that the entry 512 ("ANTHONY") that is associated with the interface element 508 (e.g., a representation of a name field) has a single word, which is a format that does not correspond to the format of the multiple word name field that is associated with the interface element 508. In some embodiments, the computing device 500 can increase the font size of the interface element 512 and present the interface element 512 in a bold font that emphasizes to a user that the entry may be invalid.

By way of further example, the computing device 500 can determine that the interface element 514 ("$5,400") that represents an entry in a gross pay field represented by the interface element 510 has a format that does not correspond (e.g., does not have currency precision of two (2) places to the right of the decimal point) to the format of the gross pay field represented by the interface element 510. Further, the computing device 500 can determine that the interface element 516 ("1,510.58") that represents a gross pay entry may be missing the dollar sign that is associated with a gross pay format. The computing device 500 can then present the interface element 516 in a larger font to indicate to a user that the entry associated with the interface element 516 may be missing the dollar sign and that the user can provide an input to modify the entry associated with the interface element 516 (e.g., an input to add the dollar sign via an onscreen keyboard).

The interface element 518, which indicates "SUBMIT MODIFICATIONS" is a control element that can be used to submit any modifications that the user entered and would like to include as part of the validated report that is represented in the user interface 504. For example, a user touching the interface element 518 can cause the computing device to generate a validated report (e.g., a validated payroll report) that includes any modifications that the user entered.

Figure 6:
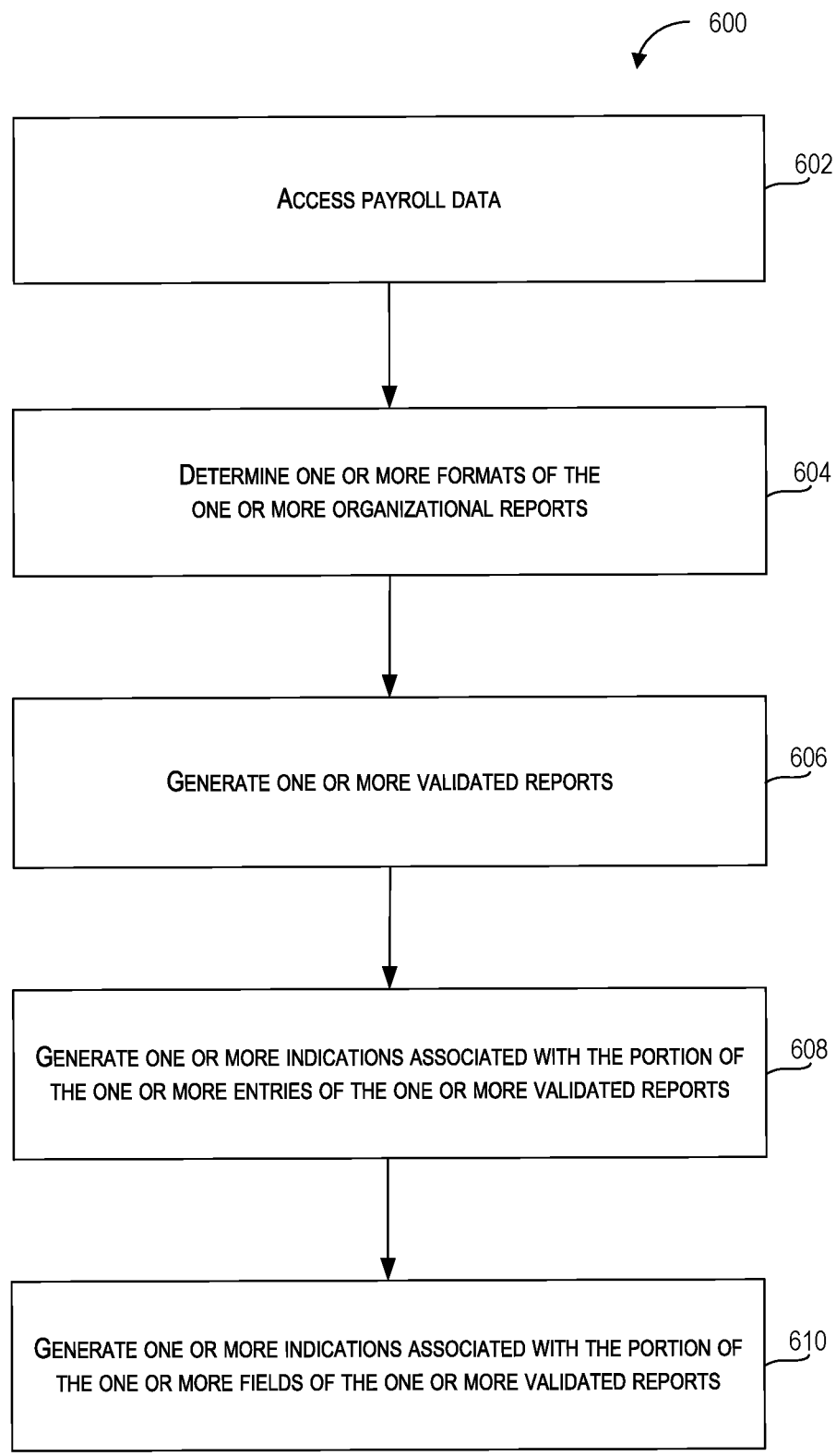
FIG. 6 depicts a flow diagram of validating and migrating organizational data according to example embodiments of the present disclosure.

FIG. 6 depicts a flow diagram of validating and migrating organizational data according to example embodiments of the present disclosure. One or more portions of the method 600 can be executed and/or implemented on one or more computing devices or computing systems including, for example, the computing system 110, the remote computing system 130, the one or more computing devices 152, and/or the computing device 200. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include accessing organizational data. The organizational data can include one or more organizational reports. For example, the organizational reports can be payroll reports associated with one or more payrolls of an organization. Further, the one or more organizational reports can include one or more fields respectively associated with one or more entries. For example, the computing system 110 can access organizational data that includes one or more organizational reports associated with one or more payrolls of employees that are members of the accounting department of the organization. The one or more organizational reports can include one or more fields associated with the At 604, the method 600 can include determining one or more formats of the one or more organizational reports based at least in part on one or more configurations of the one or more fields. For example, the computing system 110 can access a file header of the organizational data that includes information associated with one or more formats of the one or more organizational reports.

At 606, the method 600 can include generating one or more validated reports based at least in part on performance of one or more validation operations comprising evaluation of a validity of each of the one or more organizational reports. The one or more validated reports can include a portion of the one or more fields and a portion of the one or more entries. For example, the computing system 110 can perform one or more validation operations including determining whether each of the one or more fields has an entry that is of valid length (e.g., a department name field permitting an entry of one character in length may be too short and not valid) and/or valid format (e.g., an income field with a numerical amount may be valid).

At 608, the method 600 can include generating one or more indications associated with the validity of the portion of the one or more entries of the one or more validated reports that were evaluated. For example, the computing system 110 can generate one or more indications around the one or more entries that can be displayed on a display output device of the computing system 110 or another computing system and/or computing device that is configured to receive information and/or data from the computing system 110. Further, the one or more indications can include colored highlighting (e.g., green highlighting) around the one or more entries that were determined to be valid and/or colored highlighting (e.g., red highlighting) around the one or more entries that were determined to be invalid.

At 610, the method 600 can include generating one or more indications associated with the validity of the portion of the one or more fields of the one or more validated reports that were evaluated. For example, the computing system 110 can generate one or more indications around the one or more fields that can be displayed on a display output device of the computing system 110 or another computing system and/or computing device that is configured to receive information and/or data from the computing system 110. Further, the one or more indications can include colored highlighting (e.g., green highlighting) around the one or more fields that were determined to be valid and/or colored highlighting (e.g., red highlighting) around the one or more fields that were determined to be invalid.

Figure 7:
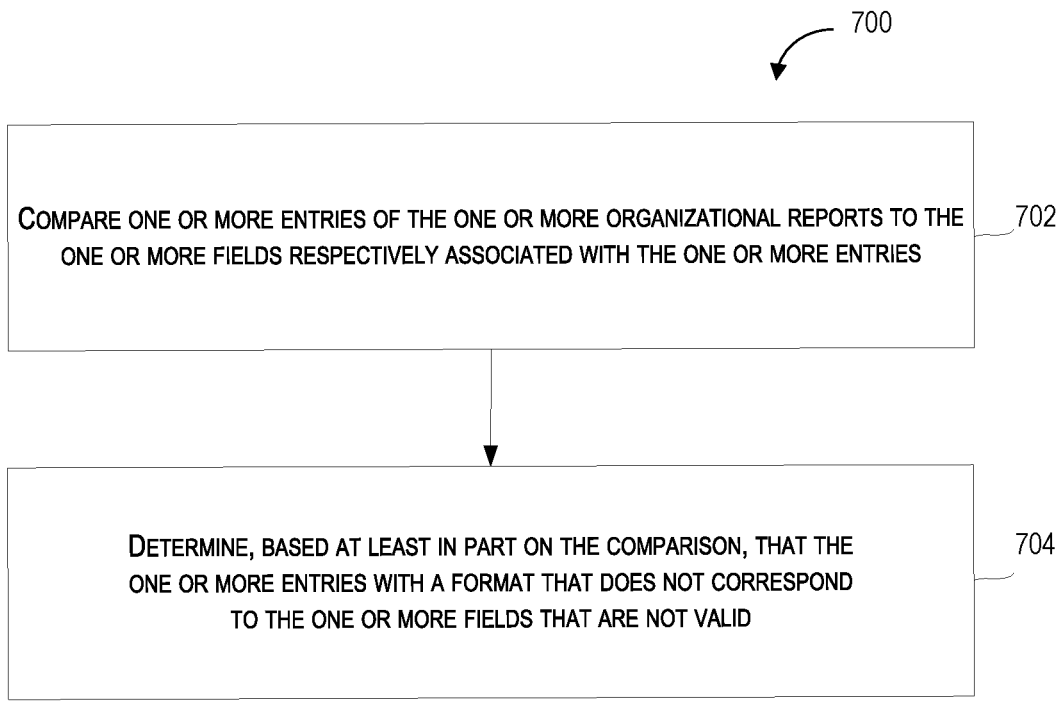
FIG. 7 depicts a flow diagram of validating and migrating organizational data according to example embodiments of the present disclosure.

FIG. 7 depicts a flow diagram of validating and migrating organizational data according to example embodiments of the present disclosure. One or more portions of the method 700 can be executed and/or implemented on one or more computing devices or computing systems including, for example, the computing system 110, the remote computing system 130, the one or more computing devices 152, and/or the computing device 200. Further, one or more portions of the method 700 can be executed or implemented as an algorithm on the hardware devices or systems disclosed herein. FIG. 7 depicts steps performed in a particular order for purposes of illustration and discussion. In some embodiments, one or more portions of the method 700 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include comparing the one or more entries of the one or more organizational reports to the one or more fields respectively associated with the one or more entries. Further, the computing system 110 can access each of the one or more entries and compare the content of each respective entry to a field property associated with the respective field. For example, the computing system 110 can compare a name field that is configured to include alphabetic entries to the contents of a name entry to determine whether the entry is alphabetic or whether it includes a different format (e.g., a numeric format).

At 704, the method 700 can include determining, based at least in part on the comparison, that the one or more entries with a format that does not correspond to the one or more fields are not valid. For example, the computing system 110 can determine that the entry "HOLLY MATTHEWS" (e.g., a personal name) in a date field does not correspond to the numeric format of the date field and is not valid.

Figure 8:
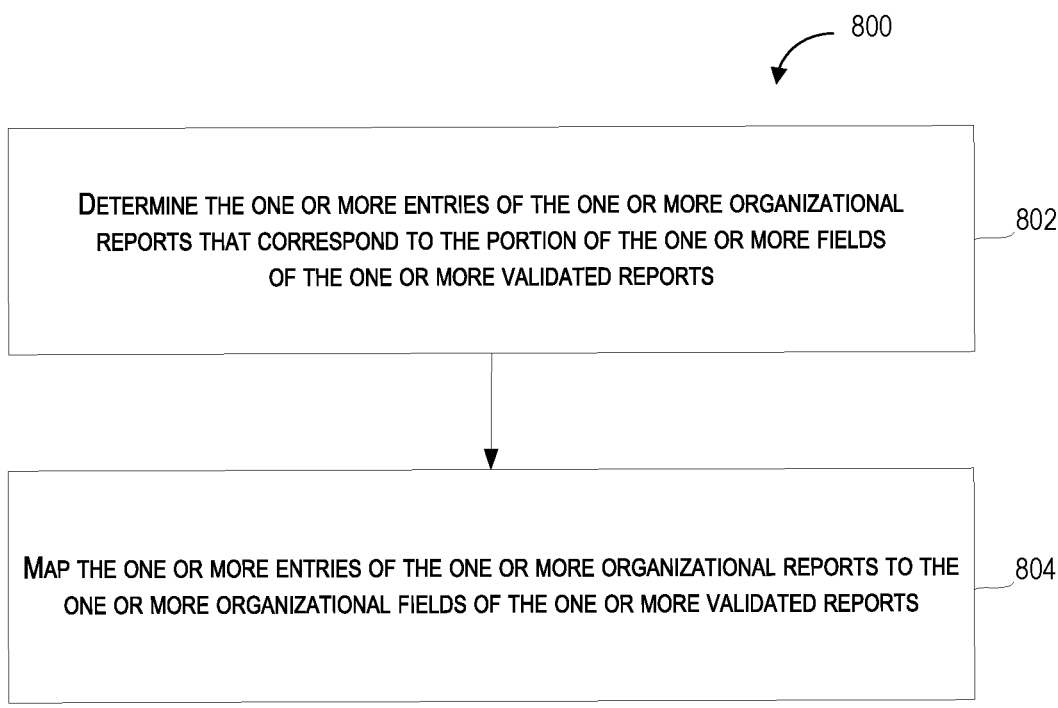
FIG. 8 depicts a flow diagram of validating and migrating organizational data according to example embodiments of the present disclosure.

FIG. 8 depicts a flow diagram of validating and migrating organizational data according to example embodiments of the present disclosure. One or more portions of the method 800 can be executed and/or implemented on one or more computing devices or computing systems including, for example, the computing system 110, the remote computing system 130, the one or more computing devices 152, and/or the computing device 200. Further, one or more portions of the method 800 can be executed or implemented as an algorithm on the hardware devices or systems disclosed herein. FIG. 8 depicts steps performed in a particular order for purposes of illustration and discussion. In some embodiments, one or more portions of the method 800 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining the one or more entries of the one or more organizational reports that correspond to the portion of the one or more fields of the one or more validated reports. For example, the computing system 110 can determine the one or more entries that have the same format as one or more respective fields. For example, a dollar amount entry would have the same format as a gross pay field that is configured to receive dollar amounts.

At 804, the method 800 can include mapping the one or more entries of the one or more organizational reports to the one or more organizational fields of the one or more validated reports. For example, the computing system 110 can map each entry of an organizational report to a corresponding field of a validated report.

Figure 9:
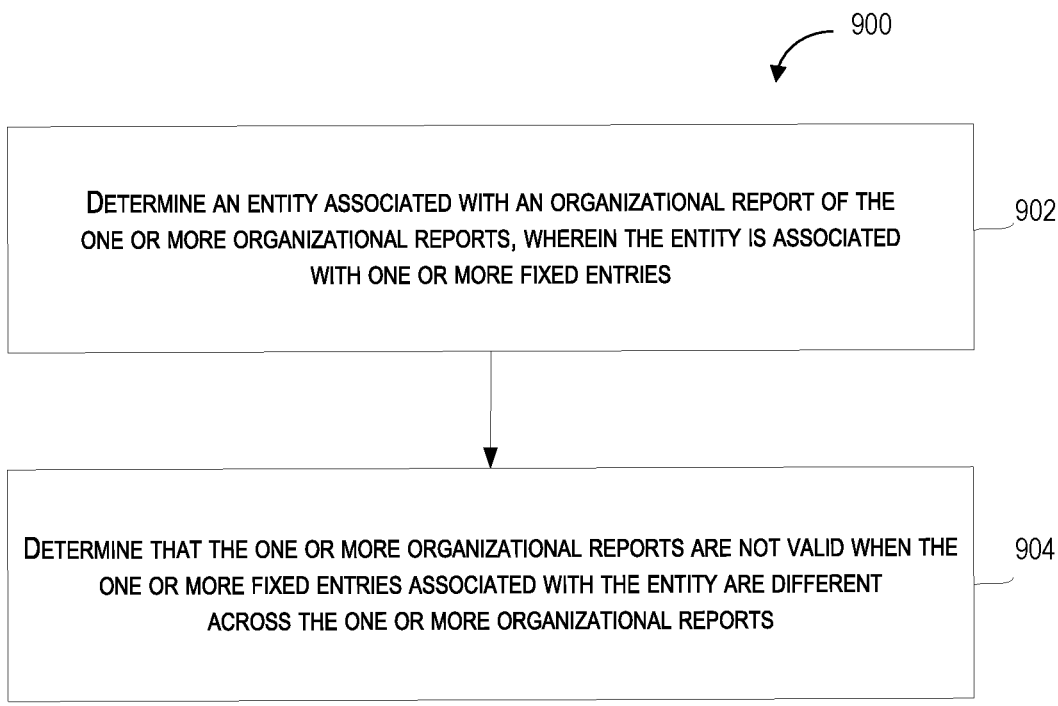
FIG. 9 depicts a flow diagram of validating and migrating organizational data according to example embodiments of the present disclosure.

FIG. 9 depicts a flow diagram of validating and migrating organizational data according to example embodiments of the present disclosure. One or more portions of the method 900 can be executed and/or implemented on one or more computing devices or computing systems including, for example, the computing system 110, the remote computing system 130, the one or more computing devices 152, and/or the computing device 200. Further, one or more portions of the method 900 can be executed or implemented as an algorithm on the hardware devices or systems disclosed herein. FIG. 9 depicts steps performed in a particular order for purposes of illustration and discussion. In some embodiments, one or more portions of the method 900 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining an entity associated with an organizational report of the one or more organizational reports. Further, the entity can be associated with one or more fixed entries. For example, the computing system 110 can determine that a department (e.g., the marketing department) is an entity associated with an organizational report and that the entity will not change when a validated report is generated (e.g., the department (marketing) associated with the validated will remain the same as the organizational report and will not change).

At 904, the method 900 can include determining that the one or more organizational reports are not valid when the one or more fixed entries associated with the entity are different across the one or more organizational reports. For example, the computing system 110 can determine that when the entity (e.g., the department) associated with an organizational report is the "accounting department" that a validated report generated on the basis of that organizational report that indicates that the entity is the "marketing department" is an invalid report.

Figure 10:
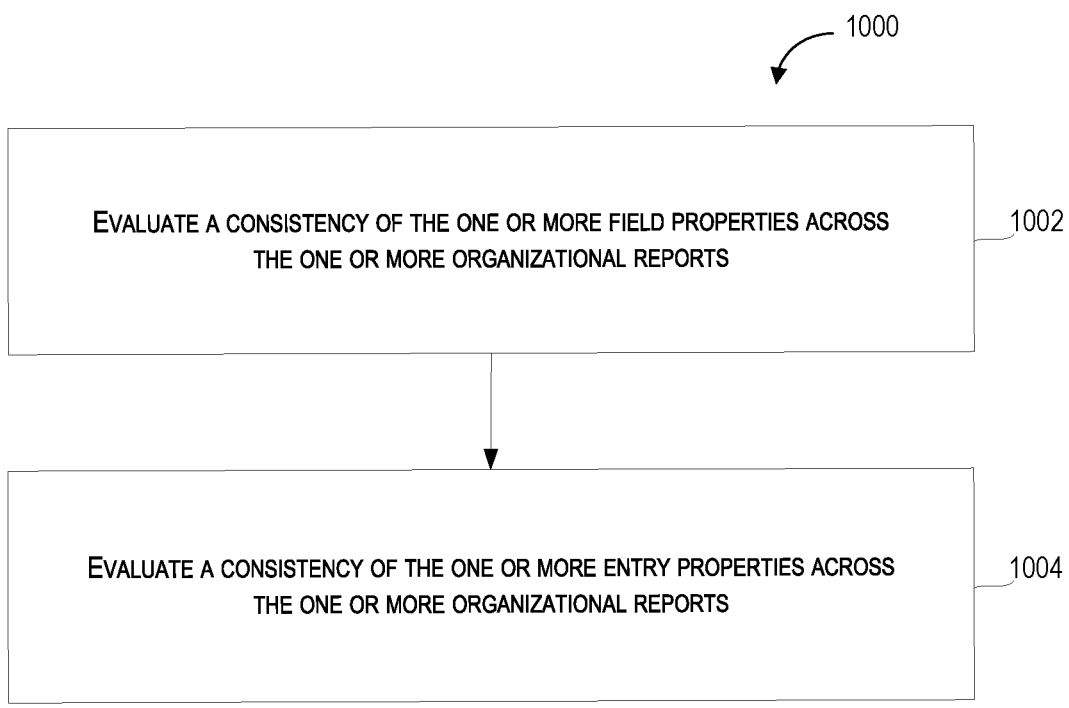
FIG. 10 depicts a flow diagram of validating and migrating organizational data according to example embodiments of the present disclosure.

FIG. 10 depicts a flow diagram of validating and migrating organizational data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. FIG. 10 depicts steps performed in a particular order for purposes of illustration and discussion. In some embodiments, one or more portions of the method 1000 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include evaluating a consistency of the one or more field properties across the one or more organizational reports. For example, the computing system 110 can determine that in a set of one hundred (100) organizational reports in which ninety-nine (99) organizational reports include a date field and one organizational report does not include a date field, that the organizational report that does not include the date field is inconsistent with the other ninety-nine (99) organizational reports.

At 1004, the method 1000 can include evaluating a consistency of the one or more entry properties across the one or more organizational reports. For example, the computing system 110 can determine that in a set of one hundred (100) organizational reports in which ninety-nine (99) organizational reports entries in every field and one organizational report has half of its fields empty, that the organizational report with half of its fields empty is inconsistent with the other ninety-nine (99) organizational reports.

Figure 11:
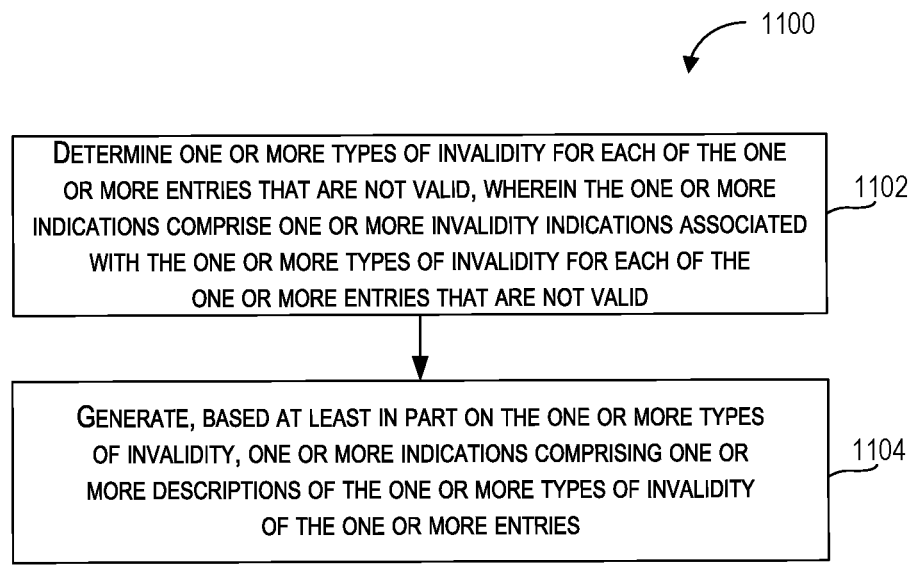
FIG. 11 depicts a flow diagram of validating and migrating organizational data according to example embodiments of the present disclosure.

FIG. 11 depicts a flow diagram of validating and migrating organizational data according to example embodiments of the present disclosure. One or more portions of the method 1100 can be executed and/or implemented on one or more computing devices or computing systems including, for example, the computing system 110, the remote computing system 130, the one or more computing devices 152, and/or the computing device 200. Further, one or more portions of the method 1100 can be executed or implemented as an algorithm on the hardware devices or systems disclosed herein. FIG. 11 depicts steps performed in a particular order for purposes of illustration and discussion. In some embodiments, one or more portions of the method 1100 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining one or more types of invalidity for each of the one or more entries that are not valid. Further, the one or more indications can include one or more invalidity indications associated with the one or more types of invalidity for each of the one or more entries that are not valid. For example, the computing system 110 can determine whether each of the one or more date entries has invalid syntax based on whether the entry conforms to a particular format (e.g., Aug. 24, 2020 in which a two digit day is followed by two digit month followed by a four digit year)

At 1104, the method 1100 can include generating, based at least in part on the one or more types of invalidity, one or more indications comprising one or more descriptions of the one or more types of invalidity of the one or more entries. For example, the computing system 110 can generate an indication that is displayed on a display output device and which highlights (e.g., a bright green highlight) the one or more entries that were determined to be invalid.

Figure 12:
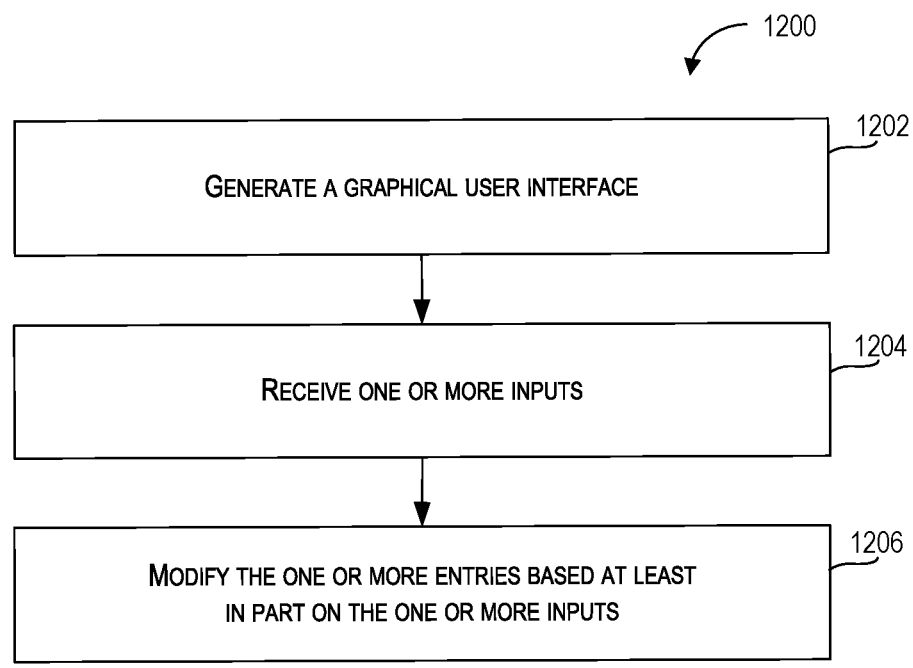
FIG. 12 depicts a flow diagram of validating and migrating organizational data according to example embodiments of the present disclosure.

FIG. 12 depicts a flow diagram of validating and migrating organizational data according to example embodiments of the present disclosure. One or more portions of the method 1200 can be executed and/or implemented on one or more computing devices or computing systems including, for example, the computing system 110, the remote computing system 130, the one or more computing devices 152, and/or the computing device 200. Further, one or more portions of the method 1200 can be executed or implemented as an algorithm on the hardware devices or systems disclosed herein. FIG. 12 depicts steps performed in a particular order for purposes of illustration and discussion. In some embodiments, one or more portions of the method 1200 can be performed as part of the method 600 that is depicted in FIG. 6. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include generating a graphical user interface comprising one or more interface elements respectively associated with the one or more fields of the one or more validated reports. The one or more interface elements can be configured to receive one or more inputs to modify the one or more entries. For example, the computing system 110 can generate a graphical user interface on a display output device (e.g., a touchscreen display device) that shows a representation of the one or more validated reports and includes interface elements that the user can use to modify one or more entries of the one or more validated reports.

At 1204, the method 1200 can include receiving the one or more inputs to modify the one or more entries. For example, the computing system 110 can include a touch screen display that can display the one or more entries. The user can touch the portion of the touch screen display that includes the one or more entries and can then use an on-screen keyboard to modify the one or more entries.

At 1206, the method 1200 can include modifying the one or more entries based at least in part on the one or more inputs. For example, the computing system 110 can use the input provided by the user and replace an existing entry with the entry specified by the one or more inputs provided by the user.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "determining," "identifying," "adjusting," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the appended claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system that implements an organizational management platform that controls and leverages one or more sets of organizational data to manage organizational applications for one or more organizations that respectively correspond to the one or more sets of organizational data, the computing system comprising:
   one or more processors;
   one or more databases that collectively store the one or more sets of organizational data, wherein the one or more sets of organizational data respectively comprise an object graph data structure comprising a plurality of objects that respectively correspond to a plurality of entities of an organization of the one or more organizations; and
   one or more non-transitory computer-readable media that store instructions that, when executed by the one or more processors, cause the computing system to perform operations, the operations comprising:
      accessing organizational data from a set of the one or more sets of organizational data, the organizational data corresponding to the organization and comprising one or more payroll reports associated with one or more payrolls of the organization, wherein the one or more payroll reports comprise one or more fields respectively associated with one or more entries;
      generating a graphical user interface (GUI) for presentation on a display device, the GUI comprising one or more first interface elements respectively associated with the one or more fields and one or more second interface elements respectively associated with the one or more entries;
      determining one or more formats of the one or more payroll reports based at least in part on one or more configurations of the one or more fields;
      generating one or more validated reports based at least in part on performance of one or more validation operations comprising evaluation of a validity of each of the one or more payroll reports, wherein the one or more validated reports comprise a portion of the one or more fields and a portion of the one or more entries; and
      generating one or more indications associated with the validity of the portion of the one or more entries of the one or more validated reports that were evaluated,
      wherein evaluation of the validity of each of the one or more payroll reports comprises traversing the object graph data structure to validate at least one of the one or more fields or the one or more entries against one or more attribute values of at least one object of the plurality of objects, and
      wherein evaluation of the validity of each of the one or more payroll reports for migration of data from a first application of the organizational applications to a second application of the organizational applications comprises:
         evaluating, by traversing the object graph data structure, one or more fields and one or more entries from a first payroll report associated with the first application to determine whether the one or more fields and the one or more entries from the first payroll report are valid according to at least one of:
            a result of the computing system comparing a format or syntax of the one or more fields and the one or more entries against an expected format or syntax of the one or more fields and the one or more entries, or
            a result of the computing system evaluating a consistency of the one or more fields and the one or more entries against properties of other fields and entries, and
         in response to the computing system determining at least one of the one or more fields or the one or more entries from the first payroll report are invalid based on the evaluating, within the GUI altering a presentation on the display device of the one or more first interface elements or the one or more second interface elements by:
            automatically changing a visual characteristic associated with the at least one of the one or more fields or the one or more entries or automatically modifying the at least one of the one or more fields or the one or more entries so as to be valid, and
         generating, for presentation on the display device via the GUI, a first validated payroll report associated with the second application, the first validated payroll report including the changed visual characteristic associated with the at least one of the one or more fields or the one or more entries or the modified at least one of the one or more fields or the one or more entries.

2. The computing system of claim 1, wherein comparing the format or syntax of the one or more fields and the one or more entries against the expected format or syntax of the one or more fields and the one or more entries comprises:
   comparing one or more entries from the first payroll report to one or more fields respectively associated with the one or more entries; and
   determining, based at least in part on the comparison, that the one or more entries with a format that does not correspond to the one or more fields are not valid.

3. The computing system of claim 1, wherein the one or more indications comprise one or more indications that a field is valid, one or more indications that a field is not valid, one or more indications that an entry is valid, or one or more indications that an entry is not valid.

4. The computing system of claim 1, wherein comparing the format or syntax of the one or more fields and the one or more entries against the expected format or syntax of the one or more fields and the one or more entries comprises:
   determining an entity of the plurality of entities is associated with the first payroll report among a plurality of payroll reports, wherein the entity is associated with one or more fixed entries; and
   determining that a portion of the first payroll report is not valid when the one or more fixed entries associated with the entity from the first payroll report is different compared to the plurality of payroll reports.

5. The computing system of claim 4, wherein the entity comprises an employee of the organization or a department of the organization.

6. The computing system of claim 1, wherein
   the second application includes information and/or data associated with one or more formats and/or one or more configurations for one or more fields associated with one or more payroll reports associated with the second application, each of the one or more fields from the first payroll report is associated with one or more field properties comprising a field type, a field length, or a field creation time, and wherein evaluating the consistency of the one or more fields from the first payroll report comprises:

evaluating a consistency of the one or more field properties with respect to each of the one or more fields from the first payroll report against field properties for corresponding fields from across the one or more payroll reports associated with the second application.

7. The computing system of claim 1, wherein the second application includes information and/or data associated with one or more formats and/or one or more configurations for one or more entries associated with one or more payroll reports associated with the second application, each of the one or more entries from the first payroll report is associated with one or more entry properties comprising an entry type, an entry length, or an entry creation time, and wherein evaluating the consistency of the one or more entries from the first payroll report comprises:

evaluating a consistency of the one or more entry properties with respect to each of the one or more entries from the first payroll report against entry properties for corresponding entries from across the one or more payroll reports associated with the second application.

8. The computing system of claim 1, further comprising:

providing, for display on the display device of the computing system, a first textual indication that an entry among the one or more entries is valid in response to determining the entry among the one or more entries from the first payroll report is valid based on the evaluating, and providing, for display on the display device of the computing system, a second textual indication that an entry among the one or more entries is invalid in response to determining the entry among the one or more entries from the first payroll report is invalid based on the evaluating.

9. The computing system of claim 1, wherein the operations further comprise:

determining one or more types of invalidity for each of the one or more entries that are not valid, wherein the one or more indications comprise one or more invalidity indications associated with the one or more types of invalidity for each of the one or more entries that are not valid.

10. The computing system of claim 9, wherein the operations further comprise:

generating, based at least in part on the one or more types of invalidity, one or more indications comprising one or more descriptions of the one or more types of invalidity of the one or more entries.

11. The computing system of claim 9, wherein the one or more types of invalidity comprise invalid syntax, field-entry inconsistency invalidity, and quantitative invalidity.

12. The computing system of claim 1,
wherein
in response to automatically changing the visual characteristic associated with the at least one of the one or more fields or the one or more entries, the one or more first interface elements are configured to receive one or more inputs to modify the one or more fields determined to be invalid or the one or more second interface elements are configured to receive one or more inputs to modify the one or more entries determined to be invalid, and the method comprises:

receiving the one or more inputs to modify the at least one of the one or more fields or the one or more entries determined to be invalid; and modifying the at least one of the one or more fields or the one or more entries determined to be invalid, based at least in part on the one or more inputs, wherein modifying the at least one of the one or more fields or the one or more entries comprises deleting an entry of the one or more entries, adding a new entry to the one or more entries, or changing an entry of the one or more entries.

13. The computing system of claim 1, wherein the automatically modifying the at least one of the one or more fields or the one or more entries comprises deleting an entry of the one or more entries, adding a new entry to the one or more entries, or changing an entry of the one or more entries.

14. The computing system of claim 1, wherein changing the visual characteristic comprises providing a highlight around the at least one of the one or more fields or the one or more entries that are invalid, or providing one or more colors around at least one of the one or more fields or the one or more entries that are invalid.

15. A computer-implemented method for implementing an organizational management platform that controls and leverages one or more sets of organizational data to manage organizational applications for one or more organizations that respectively correspond to the one or more sets of organizational data, the computer-implemented method comprising:

maintaining, by a computing system comprising one or more processors, the one or more sets of organizational data, the one or more sets of organizational data respectively comprising an object graph data structure comprising a plurality of objects that respectively correspond to a plurality of entities of an organization of the one or more organizations;

accessing, by the computing system, organizational data from a set of the one or more sets of organizational data, the organizational data corresponding to the organization and comprising one or more organizational reports associated with the organization, wherein the one or more organizational reports comprise one or more fields respectively associated with one or more entries;

generating, by the computing system, a graphical user interface (GUI) for presentation on a display device, the GUI comprising one or more first interface elements respectively associated with the one or more fields and one or more second interface elements respectively associated with the one or more entries;

determining, by the computing system, one or more formats of the one or more organizational reports based at least in part on one or more configurations of the one or more fields;

generating, by the computing system, one or more validated reports based at least in part on performance of one or more validation operations comprising evaluation of a validity of each of the one or more organizational reports, wherein the one or more validated reports comprise a portion of the one or more fields and a portion of the one or more entries; and generating, by the computing system, one or more indications associated with the validity of the portion of the one or more entries of the one or more validated reports that were evaluated, wherein evaluation of the validity of each of the one or more organizational reports comprises traversing, by the computing system, the object graph data structure to validate at least one of the one or more fields or the one or more entries against one or more attribute values of at least one object of the plurality of objects, and wherein evaluation of the validity of each of the one or more organizational reports for migration of data from a first application of the organizational applications to a second application of the organizational applications comprises:

evaluating, by traversing the object graph data structure, one or more fields and one or more entries from a first organizational report associated with the first application to determine whether the one or more fields and the one or more entries from the first organizational report are valid according to at least one of:

a result of the computing system comparing a format or syntax of the one or more fields and the one or more entries against an expected format or syntax of the one or more fields and the one or more entries, or a result of the computing system evaluating a consistency of the one or more fields and the one or more entries against properties of other fields and entries, and in response to the computing system determining at least one of the one or more fields or the one or more entries from the first organizational report are invalid based on the evaluating, within the GUI altering a presentation on the display device of the one or more first interface elements or the one or more second interface elements by:

automatically changing a visual characteristic associated with the at least one of the one or more fields or the one or more entries or automatically modifying the at least one of the one or more fields or the one or more entries so as to be valid, and generating, for presentation on the display device via the GUI, a first validated organizational report associated with the second application, the first validated organizational report including the changed visual characteristic associated with the at least one of the one or more fields or the one or more entries or the modified at least one of the one or more fields or the one or more entries.

16. The computer-implemented method of claim 15, wherein the one or more entries from the first organizational report comprise one or more payroll entries for one or more employees of the organization.

17. The computer-implemented method of claim 15, wherein the one or more formats are based at least in part on one or more applications that generate the one or more organizational reports.

18. One or more tangible non-transitory computer-readable media storing computer-readable instructions that when executed by one or more processors cause the one or more processors to perform operations, the operations comprising:

maintaining one or more sets of organizational data that respectively correspond to one or more organizations, the one or more sets of organizational data respectively comprising an object graph data structure comprising a plurality of objects that respectively correspond to a plurality of entities of an organization of the one or more organizations;

accessing organizational data from a set of the one or more sets of organizational data, the organizational data corresponding to the organization and comprising one or more organizational reports associated with one or more payrolls of the organization, wherein the one or more organizational reports comprise one or more fields respectively associated with one or more entries;

generating a graphical user interface (GUI) for presentation on a display device, the GUI comprising one or more first interface elements respectively associated with the one or more fields and one or more second interface elements respectively associated with the one or more entries;

determining one or more formats of the one or more organizational reports based at least in part on one or more configurations of the one or more fields;

generating one or more validated reports based at least in part on performance of one or more validation operations comprising evaluation of a validity of each of the one or more organizational reports, wherein the one or more validated reports comprise a portion of the one or more fields and a portion of the one or more entries; and generating one or more indications associated with the validity of the portion of the one or more entries of the one or more validated reports that were evaluated, wherein evaluation of the validity of each of the one or more organizational reports comprises traversing the object graph data structure to validate at least one of the one or more fields or the one or more entries against one or more attribute values of at least one object of the plurality of objects, and wherein evaluation of the validity of each of the one or more organizational reports for migration of data from a first application associated with the organization to a second application associated with the organization comprises:

evaluating, by traversing the object graph data structure, one or more fields and one or more entries from a first organizational report associated with the first application to determine whether the one or more fields and the one or more entries from the first organizational report are valid according to at least one of:

a result of the computing system comparing a format or syntax of the one or more fields and the one or more entries against an expected format or syntax of the one or more fields and the one or more entries, or a result of the computing system evaluating a consistency of the one or more fields and the one or more entries against properties of other fields and entries, and in response to the computing system determining at least one of the one or more fields or the one or more entries from the first organizational report are invalid based on the evaluating, within the GUI altering a presentation on the display device of the one or more first interface elements or the one or more second interface elements by:

automatically changing a visual characteristic associated with the at least one of the one or more fields or the one or more entries or automatically modifying the at least one of the one or more fields or the one or more entries so as to be valid, and generating, for presentation on the display device via the GUI, a first validated organizational report associated with the second application, the first validated organizational report including the changed visual characteristic associated with the at least one of the one or more fields or the one or more entries or the modified at least one of the one or more fields or the one or more entries.

19. The one or more tangible non-transitory computer-readable media of claim 18, wherein the one or more configurations comprise one or more positions of the one or more fields within the one or more organizational reports.

20. The one or more tangible non-transitory computer-readable media of claim 19, wherein the one or more positions comprise one or more absolute positions of the one or more fields or one or more relative positions of the one or more fields.

* * * * *